(12) United States Patent
Shindo et al.

(10) Patent No.: US 7,976,409 B2
(45) Date of Patent: Jul. 12, 2011

(54) GOLF BALL

(75) Inventors: Jun Shindo, Chichibu (JP); Kae Iizuka, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 124 days.

(21) Appl. No.: 12/404,563

(22) Filed: Mar. 16, 2009

(65) Prior Publication Data
US 2009/0239683 A1 Sep. 24, 2009

Related U.S. Application Data

(63) Continuation-in-part of application No. 11/878,941, filed on Jul. 27, 2007, now Pat. No. 7,559,855, which is a continuation-in-part of application No. 11/324,297, filed on Jan. 4, 2006, now Pat. No. 7,294,067.

(51) Int. Cl.
*A63B 37/06* (2006.01)
(52) U.S. Cl. ........................................................ 473/373
(58) Field of Classification Search .................. 473/373, 473/374
See application file for complete search history.

(56) References Cited

U.S. PATENT DOCUMENTS

| | | | |
|---|---|---|---|
| 4,792,908 A | 12/1988 | Brantley, Jr. | |
| 6,184,276 B1 | 2/2001 | Ignatz-Hoover | |
| 6,194,505 B1 | 2/2001 | Sone et al. | |
| 6,277,924 B1 | 8/2001 | Hamada et al. | |
| 6,372,847 B1 | 4/2002 | Wouters | |
| 6,596,801 B2 | 7/2003 | Higuchi et al. | |
| 6,602,941 B2 | 8/2003 | Higuchi et al. | |
| 6,634,961 B2 | 10/2003 | Higuchi et al. | |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,795,172 B2 | 9/2004 | Putman et al. | |
| 6,818,705 B2 | 11/2004 | Wu et al. | |
| 6,837,803 B2 | 1/2005 | Nanba et al. | |
| 6,841,642 B2 | 1/2005 | Kaszas | |
| 6,921,345 B2 | 7/2005 | Higuchi et al. | |
| 6,923,735 B1 | 8/2005 | Hayashi | |
| 7,250,010 B1 | 7/2007 | Shindo et al. | |
| 7,294,067 B2 | 11/2007 | Shindo et al. | |
| 7,559,855 B2* | 7/2009 | Shindo et al. ............. | 473/374 |
| 7,563,181 B2* | 7/2009 | Shindo et al. ............. | 473/374 |
| 2004/0147694 A1 | 7/2004 | Sone et al. | |
| 2005/0148723 A1 | 7/2005 | Kondou | |
| 2008/0076600 A1 | 3/2008 | Shindo et al. | |

FOREIGN PATENT DOCUMENTS

| | | |
|---|---|---|
| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-121815 A | 4/2004 |
| JP | 2004-292667 A | 10/2004 |
| JP | 2009-11434 A | 1/2009 |
| WO | 03/082925 | 10/2003 |

OTHER PUBLICATIONS

Report of Research & Development, Fine Chemical, vol. 23, No. 9, p. 5-15 (1994).
Hydrolysis of Tri-tert-butylaluminum by Mason et al., J. American Chemical Society, vol. 115, pp. 4971-4984 (1993).
Three-Coordinate Aluminum Is Not a Prerequisite for Catalytic Activity in the Zirconocene-Alumoxane Polymerization of Ethylene, by Harlen et al, J. American Chemical Society, vol. 117, pp. 6465-6474, (1995).
"The testing result of Mooney Viscosity by MVR (Mooney viscometer) which is requested by the client", Ueshima Seisakusho Co., Ltd.
C.B. Friedersdorf et al., "The application of Mooney relaxation to QC", Rubber World, Jan. 1995, pp. 30-34.
I. Duvdevani, "Processability by Mooney relaxation for isobutylene elastomers" Rubber World, Jan. 1998, pp. 18-21.
"Standard Test Methods for Rubber—Viscosity, Stress Relaxation, and Pre-Vulcanization Characteristics (Mooney Viscometer)", ASTM Int'l, D1646-03, 2003, pp. 1-12/E.
LANXESS Product Data Sheet for Buna CB 22 (Mar. 24, 2006).
Partial Translation of Information Statement, corresponding to Application No. 2006-348794, dated Jun. 8, 2010.

* cited by examiner

*Primary Examiner* — Raeann Trimiew
(74) *Attorney, Agent, or Firm* — Sughrue Mion, PLLC

(57) ABSTRACT

The present invention provides a multi-piece solid golf ball having a core, an inner cover layer and an outer cover layer. The core is made of a material obtained by molding under applied heat a rubber composition containing (a) a base rubber containing polybutadiene having a stress relaxation time $(T_{80})$ of 3.5 or less, (b) an unsaturated carboxylic acid and/or a metal salt thereof, and (c) an organic peroxide. The inner cover layer has a Shore D hardness of from 50 to 80, the outer cover layer has a Shore D hardness of from 35 to 60 which is lower than the Shore D hardness of the inner cover layer, and the inner cover layer is formed primarily of a specific, highly neutralized resin mixture. The golf ball as a whole has an excellent rebound, a good, soft feel on impact, and an outstanding spin performance, and is capable of achieving an increased distance.

8 Claims, No Drawings

GOLF BALL

CROSS-REFERENCE TO RELATED APPLICATION

This application is a continuation-in-part of application Ser. No. 11/878,941 filed on Jul. 27, 2007, now U.S.Pat. No. 7,559,885, which is a continuation-in-part of application Ser. No. 11/324,297 filed on Jan. 4, 2006, now U.S. Pat No. 7,294,067, the entire contents of which are hereby incorporated by reference.

BACKGROUND OF THE INVENTION

The present invention relates to a golf ball having an excellent rebound.

Efforts to confer golf balls with an excellent rebound have until now focused on and optimized one or more indicator of the polybutadiene used as the base rubber, such as the Mooney viscosity, polymerization catalyst, solvent viscosity and molecular weight distribution. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of 30 to 42 and a molecular weight distribution (Mw/Mn) of 2.5 to 3.8. Patent Document 2 (U.S. Pat. No. 6,818,705) describes, for the same purpose, a polybutadiene having a molecular weight of at least 200,000 and a resilience index of at least 40.

However, because many golfers desire golf balls capable of traveling a longer distance, there exists a need for the development of golf balls having an even better rebound.

Patent Document 1: JP-A 2004-292667
Patent Document 2: U.S. Pat. No. 6,818,705
Patent Document 3: JP-A 2002-355336
Patent Document 4: JP-A 2002-355337
Patent Document 5: JP-A 2002-355338
Patent Document 6: JP-A 2002-355339
Patent Document 7: JP-A 2002-355340
Patent Document 8: JP-A 2002-356581

SUMMARY OF THE INVENTION

It is therefore an object of the present invention to provide a golf ball having an excellent rebound.

As a result of extensive investigations, the inventor has discovered that, in a multi-piece solid golf ball composed of a core, an inner cover layer and an outer cover layer, a good ball rebound is maintained by forming the core of a material obtained by molding under applied heat a rubber composition which includes a base rubber containing a polybutadiene having a specific $T_{80}$ value, an unsaturated carboxylic acid and/or a metal salt thereof, and an organic peroxide; and by setting the inner cover layer to a Shore D hardness in a range of 50 to 80, setting the outer cover layer to a Shore D hardness in a range of 35 to 60, and forming the outer cover layer so as to be softer than the inner cover layer. Moreover, the inventor has found that the golf ball of the invention is a multi-piece solid golf ball which, due to synergistic effects owing to optimization of the core material and an appropriate distribution of hardness between the inner cover layer and the outer cover layer, has a good, soft feel on impact and an excellent spin performance, and is capable of achieving an increased distance.

Accordingly, the invention provides the following golf ball.

[1] A multi-piece solid golf ball comprising a core, an inner cover layer and an outer cover layer, wherein the core is made of a material obtained by molding under applied heat a rubber composition comprising (a) a base rubber containing polybutadiene having a stress relaxation time ($T_{80}$), defined as the time in seconds from the moment when rotor rotation is stopped immediately after measurement of the $ML_{1+4}$ (100° C.) value (the Mooney viscosity measured at 100° C. in accordance with ASTM D-1646-96) that is required for the $ML_{+4}$ value to decrease 80%, of 3.5 or less, (b) an unsaturated carboxylic acid and/or a metal salt thereof, and c) an organic peroxide; the inner cover layer has a Shore D hardness of from 50 to 80; the outer cover layer has a Shore D hardness of from 35 to 60 which is lower than the Shore D hardness of the inner cover layer; and the inner cover layer is formed primarily of a resin composition obtained by mixing:

100 parts by weight of a base resin of (A-I) from 100 to 30 wt % of an olefin-unsaturated carboxylic acid-unsaturated carboxylic acid ester ternary random copolymer and/or a metal salt thereof and (A-II) from 0 to 70 wt % of an olefin-unsaturated carboxylic acid binary random copolymer and/or a metal salt thereof, (B) from 5 to 170 parts by weight of a fatty acid or fatty acid derivative having a molecular weight of from 280 to 1500, and (C) from 0.1 to 10 parts by weight of a basic inorganic metal compound capable of neutralizing acid groups within components A and B.

[2] The golf ball of [1], wherein the rubber composition further comprises (d) an organosulfur compound.

[3] The golf ball of [1], wherein the polybutadiene having a stress relaxation time ($T_{80}$) of 3.5 or less accounts for at least 40 wt % of the base rubber.

[4] The golf ball of [1], wherein the polybutadiene having a stress relaxation time ($T_{80}$) of 3.5 or less is a polybutadiene prepared using a rare-earth catalyst.

[5] The golf ball of [1], wherein the polybutadiene having a stress relaxation time ($T_{80}$) of 3.5 or less is a polybutadiene prepared by polymerization using a rare-earth catalyst, followed by terminal modification.

[6] The golf ball of [1], wherein the olefin-unsaturated carboxylic acid-unsaturated carboxylic acid ester ternary random copolymer and/or metal salt thereof making up component (A-I) has a weight-average molecular weight (Mw) of at least 100,000 but not more than 200,000 and has a weight-average molecular weight (Mw) to number-average molecular weight (Mn) ratio of at least 3 but not more than 7.0.

[7] The golf ball of [1], wherein the olefin-unsaturated carboxylic acid binary random copolymer and/or metal salt thereof making up component (A-II) has a weight-average molecular weight (Mw) of at least 150,000 but not more than 200,000 and has a weight-average molecular weight (Mw) to number-average molecular weight (Mn) ratio of at least 3 but not more than 7.0.

[8] The golf ball of [1], wherein the resin composition has a melt flow rate, as measured in accordance with JIS-K6760 at a test temperature of 190° C. and a test load of 21 N (2.16 kgf), of at least 1 g/10 min but not more than 30 g/10 min.

DETAILED DESCRIPTION OF THE INVENTION

The invention is described more fully below.

The golf ball of the invention has a core made of a rubber composition that includes a polybutadiene as the base rubber. More specifically, the core is made of a material obtained by molding under applied heat a rubber composition which includes the following components (a) to (c):

(a) a base rubber containing polybutadiene having a stress relaxation time ($T_{80}$), as defined below, of 3.5 or less,
(b) an unsaturated carboxylic acid and/or a metal salt thereof, and
(c) an organic peroxide.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

In the practice of the invention, the polybutadiene in above component (a) includes a polybutadiene having a stress relaxation time ($T_{80}$) of 3.5 or less (which polybutadiene is sometimes abbreviated below as "BR1"). The $T_{80}$ value is preferably 3.0 or less, more preferably 2.8 or less, and even more preferably 2.5 or less. The $T_{80}$ value has a lower limit of preferably 1 or more, and more preferably 1.5 or more. At a $T_{80}$ value of more than 3.5, the objects of the invention cannot be attained. On the other hand, if the $T_{80}$ value is too small, problems may arise with workability.

The foregoing polybutadiene BR1 has a Mooney viscosity ($ML_{1+4}$ (100° C.)) which, while not subject to any particular limitation, is preferably at least 20 but not more than 80.

It is recommended that the above polybutadiene BR1 have a cis-1,4 bond content of preferably at least 60%, more preferably at least 80%, even more preferably at least 90%, and most preferably at least 95%, and a 1,2-vinyl bond content of preferably 2% or less, more preferably 1.7% or less, even more preferably 1.5% or less, and most preferably 1.3% or less. At a cis-1,4 bond content or a 1,2-vinyl bond content outside of these ranges, the rebound may decrease.

From the standpoint of rebound, it is preferable for the above polybutadiene BR1 in the invention to be a polybutadiene synthesized using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

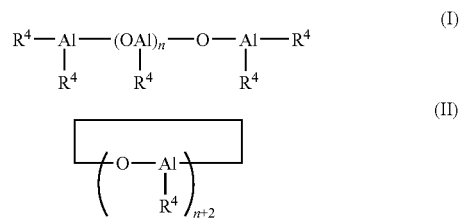

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_{22}$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of preferably from −30 to +150° C., and more preferably from 10 to 100° C.

To manufacture golf balls of stable quality, it is desirable for the above-described polybutadiene BR1 used in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5_nM'X_{4-n}$, $M'X_4$, $M'X_3$, $R^5_nM'(-R^6-COOR^7)_{4-n}$ or $R^5_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);
(4) halogenated isocyano compounds;
(5) carboxylic acids, acid halides, ester compounds, carbonate compounds and acid anhydrides of the formula $R^8$—$(COOH)_m$, $R^9(COX)_m$, $R^{10}$—$(COO$—$R^{11})$, $R^{12}$—$OCOO$—$R^{13}$, $R^{14}$—$(COOCO$—$R^{15})_m$ or

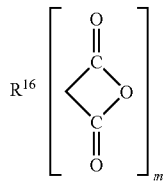

(wherein $R^8$ to $R^{16}$ are each independently a hydrocarbon group of 1 to 50 carbons, X is a halogen atom, and m is an integer from 1 to 5); and
(6) carboxylic acid metal salts of the formula $R^{17}_1M''$ $(OCOR^{18})_{4-1}$, $R^{19}_1M''$ $(OCO$—$R^2$—$COOR^2)_{-1}$ or

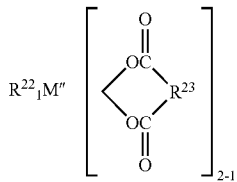

(wherein $R^{17}$ to $R^{23}$ are each independently a hydrocarbon group of 1 to 20 carbons, M'' is a tin, silicon or germanium atom, and the letter l is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene BR1 is included within the base rubber and accounts for preferably at least 40 wt %, more preferably at least 50 wt %, even more preferably at least 60 wt %, and up to 100 wt %, of the base rubber. If this proportion is too low, the rebound may decrease.

No particular limitation is imposed on rubber compounds other than BR1 which may be included in the base rubber. For example, polybutadiene rubbers having a stress relaxation time $T_{80}$ of more than 3.5 may be included, as can also other rubber compounds such as styrene-butadiene rubbers (SBR), natural rubbers, polyisoprene rubbers and ethylene-propylene-diene rubbers (EPDM). These may be used individually or as combinations of two or more thereof.

The Mooney viscosity of such additional rubbers included in the base rubber, while not subject to any particular limitation, is preferably at least 20 but preferably not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which, typically, the catalyst is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc methacrylate and zinc acrylate. The use of zinc acrylate is especially preferred.

It is recommended that the content of above component (b) per 100 parts by weight of the base rubber be preferably at least 10 parts by weight, and more preferably at least 15 parts by weight, but preferably not more than 60 parts by weight, more preferably not more than 50 parts by weight, even more preferably not more than 45 parts by weight, and most preferably not more than 40 parts by weight. Too much component (b) will make the material molded under applied heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa 3C (NOF Corporation) and Luperco 231XL (Atochem Co.). If necessary, a combination of two or more different organic peroxides may be used.

It is recommended that the amount of component (c) per 100 parts by weight of the base rubber be preferably at least 0.1 part by weight, and more preferably at least 0.3 part by weight, but preferably not more than 5 parts by weight, more preferably not more than 4 parts by weight, even more preferably not more than 3 parts by weight, and most preferably not more than 2 parts by weight. Too much or too little component (c) may make it impossible to obtain a suitable hardness distribution, resulting in a poor feel, durability and rebound.

To further improve rebound, it is desirable for the rubber composition in the invention to include also the following component (d):

(d) an organosulfur compound.

Examples of such organosulfur compounds include thiophenols, thionaphthols, halogenated thiophenols, and metal salts thereof. Specific examples include the zinc salts of pentachlorothiophenol, pentafluorothiophenol, pentabromothiophenol and p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. These may be used singly or as combinations of two or more thereof. Diphenyldisulfide and/or the zinc salt of pentachlorothiophenol are especially preferred.

It is recommended that the amount of component (d) included per 100 parts by weight of the base rubber be preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. Too much organosulfur compound may make the material molded under applied heat from the rubber composition too soft, whereas too little may make an improved rebound difficult to achieve.

The rubber composition in the invention may additionally include such additives as inorganic fillers and antioxidants. Illustrative examples of suitable inorganic fillers include zinc oxide, barium sulfate and calcium carbonate. The amount included per 100 parts by weight of the base rubber is preferably at least 5 parts by weight, more preferably at least 7 parts by weight, even more preferably at least 10 parts by weight, and most preferably at least 13 parts by weight, but preferably not more than 80 parts by weight, more preferably not more than 50 parts by weight, even more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at least 50 wt %, preferably at least 75 wt %, and most preferably 100 wt % (where the zinc oxide accounts for 100% of the inorganic filler).

The zinc oxide has an average particle size (by air permeametry) of preferably at least 0.01 μm, more preferably at least 0.05 μm, and most preferably at least 0.1 μm, but preferably not more than 2 μm, and more preferably not more than 1 μm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be preferably more than 0 part by weight, more preferably at least 0.05 part by weight, even more preferably at least 0.1 part by weight, and most preferably at least 0.2 part by weight, but preferably not more than 3 parts by weight, more preferably not more than 2 parts by weight, even more preferably not more than 1 part by weight, and most preferably not more than 0.5 part by weight.

The core in the present invention can be obtained by vulcanizing and curing the rubber composition using a method of the same sort as that used on prior-art rubber compositions for golf balls. Vulcanization may be carried out, for example, at a temperature of from 100 to 200° C. for a period of 10 to 40 minutes.

It is recommended that the core (hot-molded material) in the invention have a hardness difference, obtained by subtracting the JIS-C hardness at the center of the hot-molded material from the JIS-C hardness at the surface of the material, of preferably at least 15, more preferably at least 16, even more preferably at least 17, and most preferably at least 18, but preferably not more than 50, and more preferably not more than 40. Setting the hardness within this range is desirable for achieving a golf ball having a soft feel and a good rebound and durability.

It is also recommended that the core (hot-molded material) in the invention have a deflection, when compressed under a final load of 1275 N (130 kgf) from an initial load of 98 N (10 kgf), of preferably at least 2.0 mm, more preferably at least 2.5 mm, and even more preferably at least 2.8 mm, but preferably not more than 6.0 mm, more preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance traveled by the ball. On the other hand, a hot-molded material that is too soft may deaden the feel of the golf ball when played and compromise the rebound of the ball, resulting in a shorter distance, and may give the ball a poor durability to cracking with repeated impact.

It is recommended that the solid core in the multi-piece solid golf ball have a diameter of preferably at least 30.0 mm, more preferably at least 32.0 mm, even more preferably at least 34.0 mm, and most preferably at least 35.0 mm, but preferably not more than 40.0 mm, more preferably not more than 39.5 mm, and even more preferably not more than 39.0 mm.

It is also recommended that the core have a specific gravity of preferably at least 0.9, more preferably at least 1.0, and even more preferably at least 1.1, but preferably not more than 1.4, more preferably not more than 1.3, and even more preferably not more than 1.2.

The golf ball of the present invention is a multi-piece solid golf ball having a cover of two or more layers which are referred to herein as the "inner cover layer" and the "outer cover layer." In the invention, the inner cover layer is formed primarily of a resin composition obtained by mixing:

100 parts by weight of a base resin of (A-I) from 100 to 30 wt % of an olefin-unsaturated carboxylic acid-unsaturated carboxylic acid ester ternary random copolymer and/or a metal salt thereof and (A-II) from 0 to 70 wt % of an olefin-unsaturated carboxylic acid binary random copolymer and/or a metal salt thereof, (B) from 5 to 170 parts by weight of a fatty acid or fatty acid derivative having a molecular weight of from 280 to 1500, and (C) from 0.1 to 10 parts by weight of a basic inorganic metal compound capable of neutralizing acid groups within components A and B.

This resin mixture is described below.

The olefin-unsaturated carboxylic acid-unsaturated carboxylic acid ester ternary random copolymer and/or metal salt thereof serving as component A-I has a weight-average molecular weight (Mw) of preferably at least 100,000, more preferably at least 110,000, and even more preferably at least 120,000, but preferably not more than 200,000, more preferably not more than 190,000, and even more preferably not more than 170,000. The weight-average molecular weight (Mw) to number-average molecular weight (Mn) ratio of the copolymer is preferably at least 3, and more preferably at least 4, but preferably not more than 7.0, and more preferably not more than 6.5.

Here, the weight-average molecular weight (Mw) and number-average molecular weight (Mn) are values calculated relative to polystyrene in gel permeation chromatography (GPC). A word of explanation is needed here concerning GPC molecular weight measurement. It is not possible to directly take GPC measurements for binary copolymers and ternary copolymers because these molecules are adsorbed to the GPC column owing to the unsaturated carboxylic acid groups within the molecule. Instead, the unsaturated carboxylic acid groups are generally converted to esters, following which GPC measurement is carried out and the polystyrene-equivalent average molecular weights Mw and Mn are calculated.

Components A-I and A-II are olefin-containing copolymers. The olefin in these components is exemplified by olefins in which the number of carbons is at least 2, but not more than 8, and preferably not more than 6. Illustrative examples of such olefins include ethylene, propylene, butene, pentene, hexene, heptene and octene. Ethylene is especially preferred.

Illustrative examples of the unsaturated carboxylic acid in components A-I and A-II include acrylic acid, methacrylic acid, maleic acid and fumaric acid. Acrylic acid and methacrylic acid are especially preferred.

The unsaturated carboxylic acid ester in component A-I may be, for example, a lower alkyl ester of any of the above-mentioned unsaturated carboxylic acids. Illustrated examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The random copolymer of component A-I may be obtained by random copolymerization of the above ingredients in accordance with a known method. Here, it is recommended that the content of unsaturated carboxylic acid (acid content) included in the random copolymer be generally at least 2 wt %, preferably at least 6 wt %, and more preferably at least 8 wt %, but not more than 25 wt %, preferably not more than 20 wt %, and even more preferably not more than 15 wt %. At a low acid content, the rebound may decrease, whereas at a high acid content, the processability of the material may decrease.

The copolymer of component A-I accounts for a proportion of the overall base resin which is from 100 to 30 wt %, preferably at least 50 wt %, more preferably at least 60 wt %, and even more preferably at least 70 wt %, but preferably not more than 92 wt %, more preferably not more than 89 wt %, and even more preferably not more than 86 wt %.

The metal salts of the copolymers of components A-I and A-II may be obtained by neutralizing some of the acid groups in the random copolymer of above components A-I and A-II with metal ions.

Examples of the metal ions which neutralize the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$, $Mg^{++}$ and $Ca^{++}$ are preferred, and $Zn^{++}$ and $Mg^{++}$ are especially preferred.

In cases where a metal neutralization product is used in components A-I and A-II, i.e., in cases where an ionomer is used, the type of metal neutralization product and the degree of neutralization are not subject to any particular limitation. Specific examples include 60 mol % zinc (degree of neutralization with zinc) ethylene-acrylic acid copolymers, 40 mol % magnesium (degree of neutralization with magnesium) ethylene-acrylic acid copolymers, 40 mol % magnesium (degree of neutralization with magnesium) ethylene-methacrylic acid-isobutylene acrylate terpolymers, and 60 mol % Zn (degree of neutralization with zinc) ethylene-methacrylic acid-isobutylene acrylate terpolymers.

Illustrative examples of the olefin-unsaturated carboxylic acid-unsaturated carboxylic acid ester ternary random copolymer serving as component A-I include those available under the trade names Nucrel AN4318, Nucrel AN4319, Nucrel AN4311, Nucrel N035C and Nucrel NO200H (DuPont-Mitsui Polychemicals Co., Ltd.). Illustrative examples of the metal salts of olefin-unsaturated carboxylic acid-unsaturated carboxylic acid ester ternary random copolymers include those available under the trade names Himilan AM7316, Himilan AM7331, Himilan 1855 and Himilan 1856 (DuPont-Mitsui Polychemicals Co., Ltd.), and those available under the trade names Surlyn 6320 and Surlyn 8120 (E.I. DuPont de Nemours and Co., Ltd.).

The olefin-unsaturated carboxylic acid-unsaturated carboxylic acid binary random copolymer and/or metal salt thereof serving as component A-II has a weight-average molecular weight (Mw) of preferably at least 150,000, more preferably at least 160,000, and even more preferably at least 170,000, but preferably not more than 200,000, more preferably not more than 190,000, and even more preferably not more than 180,000. The weight-average molecular weight (Mw) to number-average molecular weight (Mn) ratio is preferably at least 3, and more preferably at least 4, but preferably not more than 7.0, and more preferably not more than 6.5.

The copolymer of component A-II accounts for a proportion of the overall base resin which is from 0 to 70 wt %, preferably at least 8 wt %, more preferably at least 11 wt %, and even more preferably at least 14 wt %, but preferably not more than 50 wt %, more preferably not more than 40 wt %, and even more preferably not more than 30 wt %.

Illustrative examples of the olefin-unsaturated carboxylic acid binary random copolymer serving as component A-II include those available under the trade names Nucrel 1560, Nucrel 1525 and Nucrel 1035 (DuPont-Mitsui Polychemicals Co., Ltd.). Illustrative examples of the metal salts of olefin-unsaturated carboxylic acid binary random copolymers include those available under the trade names Himilan 1605, Himilan 1601, Himilan 1557, Himilan 1705 and Himilan 1706 (DuPont-Mitsui Polychemicals Co., Ltd.); those available under the trade names Surlyn 7930 and Surlyn 7920 (E.I. DuPont de Nemours and Co., Ltd.); and those available under the trade names Escor 5100 and Escor 5200 (ExxonMobil Chemical).

In addition, to achieve a good rebound, use may be made of a highly neutralized ionomer in which the degree of neutralization has been enhanced by mixing components B and C below with above components A-I and A-II under applied heat.

In the practice of the invention, in the above-described highly neutralized ionomeric resin composition, (B) from 5 to 170 parts by weight of a fatty acid or fatty acid derivative having a molecular weight of from 280 to 1500, and (C) from 0.1 to 10 parts by weight of a basic inorganic metal compound capable of neutralizing acid groups within components A and B are mixed per 100 parts by weight of the foregoing base resin of components A-I and A-II.

Component B is a fatty acid or fatty acid derivative having a molecular weight of at least 280 but not more than 1500 whose purpose is to enhance the flow properties of the heated mixture. It has a molecular weight which is much smaller than that of component A, and helps to significantly increase the melt viscosity of the mixture. Also, because the fatty acid (or fatty acid derivative) of component B has a molecular weight of at least 280 but not more than 1500 and has a high content of acid groups (or derivative moieties thereof), its addition results in little if any loss of resilience.

The fatty acid or fatty acid derivative serving as component B may be an unsaturated fatty acid or fatty acid derivative having a double bond or triple bond in the alkyl moiety, or it may be a saturated fatty acid or fatty acid derivative in which all the bonds in the alkyl moiety are single bonds. It is recommended that the number of carbon atoms on the molecule be preferably at least 18, but preferably not more than 80, and more preferably not more than 40. Too few carbons may result in a poor heat resistance, and may also set the acid group content so high as to cause the acid groups to interact with acid groups present on the base resin, as a result of which the desired flow properties may not be achieved. On the other hand, too many carbons increases the molecular weight, which may lower the flow properties. In either case, the material may become difficult to use.

Specific examples of fatty acids that may be used as component B include stearic acid, 12-hydroxystearic acid, behenic acid, oleic acid, linoleic acid, linolenic acid, arachidic acid and lignoceric acid. Of these, preferred use may be made of stearic acid, arachidic acid, behenic acid, lignoceric acid and oleic acid.

The fatty acid derivative of component B is exemplified by derivatives in which the proton on the acid group of the fatty acid has been substituted. Exemplary fatty acid derivatives of this type include metallic soaps in which the proton has been substituted with a metal ion. Metal ions that may be used in such metallic soaps include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component B include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

In the present invention, the amount of component B used per 100 parts by weight of the base resin is at least 5 parts by weight, preferably at least 20 parts by weight, more preferably at least 50 parts by weight, and even more preferably at least 80 parts by weight, but not more than 170 parts by weight, preferably not more than 150 parts by weight, even more preferably not more than 130 parts by weight, and most preferably not more than 110 parts by weight.

Use may also be made of known metallic soap-modified ionomers (see, for example, U.S. Pat. Nos. 5,312,857, 5,306,760 and International Disclosure WO 98/46671) when using above component A.

Component C is a basic inorganic metal compound capable of neutralizing the acid groups in above components A and B. As mentioned in prior-art examples, when components A and B alone, and in particular a metal-modified ionomeric resin alone (e.g., a metal soap-modified ionomeric resin of the type mentioned in the foregoing patent publications, alone), are heated and mixed, as shown below, the metallic soap and unneutralized acid groups present on the ionomer undergo exchange reactions, generating a fatty acid. Because the fatty acid has a low thermal stability and readily vaporizes during molding, it causes molding defects. Moreover, if the fatty acid thus generated deposits on the surface of the molded material, it substantially lowers paint film adhesion. Component C is included so as to resolve such problems.

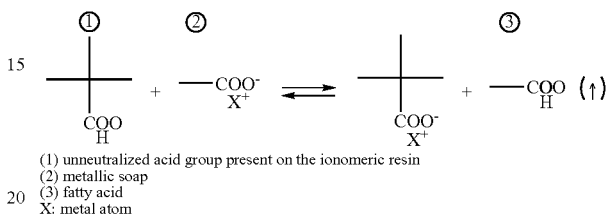

(1) unneutralized acid group present on the ionomeric resin
(2) metallic soap
(3) fatty acid
X: metal atom The heated mixture used in the present invention thus includes, as component C, a basic inorganic metal compound which neutralizes the acid groups present in above components A and B. The inclusion of component C as an essential ingredient confers excellent properties. That is, the acid groups in above components A and B are neutralized, and synergistic effects from the inclusion of each of these components increase the thermal stability of the heated mixture while at the same time conferring a good moldability and enhancing the rebound of the golf ball.

It is recommended that above component C be a basic inorganic metal compound—preferably a monoxide or hydroxide—which is capable of neutralizing acid groups in above components A and B. Because such compounds have a high reactivity with the ionomeric resin and the reaction by-products contain no organic matter, the degree of neutralization of the heated mixture can be increased without a loss of thermal stability.

The metal ions used here in the basic inorganic metal compound are exemplified by $Li^+$, $Na^+$, $K^+$, $Ca^{++}$, $Mg^{++}$, $Zn^{++}$, $Al^{+++}$, $Ni^+$, $Fe^{++}$, $Fe^{+++}$, $Cu^{++}$, $Mn^{++}$, $Sn^{++}$, $Pb^{++}$ and $Co^{++}$. Illustrative examples of the inorganic metal compound include basic inorganic fillers containing these metal ions, such as magnesium oxide, magnesium hydroxide, magnesium carbonate, zinc oxide, sodium hydroxide, sodium carbonate, calcium oxide, calcium hydroxide, lithium hydroxide and lithium carbonate. As noted above, a monoxide or hydroxide is preferred. The use of magnesium oxide or calcium hydroxide, which have high reactivities with ionomeric resins, is especially preferred.

The above basic inorganic metal compound serving as component C is an ingredient for neutralizing the acid groups in above components A and B and is included in a proportion, based on the acid groups in above components A and B, of preferably at least 30 mol %, more preferably at least 45 mol %, even more preferably at least 60 mol %, and most preferably at least 70 mol %, but preferably not more than 130 mol %, more preferably not more than 110 mol %, even more preferably not more than 100 mol %, still more preferably not more than 90 mol %, and most preferably not more than 85 mol %. In this case, the amount in which the basic inorganic metal compound serving as component C is included may be suitably selected so as to achieve the desired degree of neutralization. The component C in the invention is included in an amount, expressed on a weight basis per 100 parts by weight of the base resin, of preferably from 0.1 to 10 parts by weight, more preferably at least 0.5 part by weight, even more preferably at least 0.8 part by weight, and most preferably at least 1 part by weight, but preferably not more than 8 parts by weight, more preferably not more than 5 parts by weight, and even more preferably not more than 4 parts by weight.

The above resin composition has a melt flow rate, measured in accordance with JIS-K6760 (test temperature, 190° C.; test load, 21 N (2.16 kgf)), of preferably at least 1 g/10 min, more preferably at least 2 g/10 min, and even more preferably at least 3 g/10 min, but preferably not more than 30 g/10 min, more preferably not more than 20 g/10 min, even more preferably not more than 15 g/10 min, and most preferably not more than 10 g/min. If the melt index of this resin mixture is low, the processability of the mixture may markedly decrease.

The method of preparing the above resin mixture is not subject to any particular limitation, although use may be made of a method which involves charging the ionomers or unneutralized polymers of components A-I and A-II, together with component B and component C, into a hopper and extruding under the desired conditions. Alternatively, component B may be charged from a separate feeder. In this case, the neutralization reaction by above component C as the metal cation source with the carboxylic acids in components A-I, A-II and B may be carried out by various types of extruders. The extruder may be either a single-screw extruder or a twin-screw extruder, although a twin-screw extruder is preferable. Alternatively, these extruders may be used in a tandem arrangement, such as single-screw extruder/twin-screw extruder or twin-screw/twin-screw extruder. The extruders need not be of a special design; the use of existing extruders will suffice.

Next, the outer cover layer material is not subject to any particular limitation; a known cover material may be used to produce the outer cover layer. The outer cover layer material may be composed primarily of a thermoplastic or thermoset polyurethane elastomer, a polyester elastomer, an ionomeric resin, an ionomeric resin having a relatively high degree of neutralization, a polyolefin elastomer or a mixture thereof. Any one or mixture of two or more thereof may be used, although the use of a thermoplastic polyurethane elastomer, an ionomeric resin or an ionomeric resin having a relatively high degree of neutralization is especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8290, Pandex T8295 and Pandex T1188 (all manufactured by DIC Bayer Polymer, Ltd.). Illustrative examples of suitable commercial ionomer resins include Surlyn 6320, Surlyn 8945, Surlyn 9945 and Surlyn 8120 (both products of E.I. DuPont de Nemours and Co., Inc.), and Himilan 1706, Himilan 1605, Himilan 1855, Himilan 1557, Himilan 1601 and Himilan AM7316 (all products of DuPont-Mitsui Polychemicals Co., Ltd.).

Together with the primary material described above, the cover material may include also, as an optional material, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The golf ball of the invention can be manufactured by any suitable known method without particular limitation. In one preferred method, the solid core is placed within a given injection mold, following which a predetermined method is used to successively inject over the core the above-described intermediate layer material and cover material. In another preferred method, each of the cover materials is formed into a pair of half cups, and the resulting pairs of half cups are successively placed over the solid core and compression molded.

In the golf ball of the invention, it is critical that the outer cover layer have a lower Shore D hardness than the inner cover layer.

The inner cover layer has a Shore D hardness of at least 50, preferably at least 51, more preferably at least 52, and most preferably at least 53, but not more than 80, preferably not more than 75, more preferably not more than 70, and most preferably not more than 65.

The outer cover layer has a Shore D hardness of at least 35, preferably at least 40, more preferably at least 45, and most preferably at least 48, but not more than 60, preferably not more than 58, more preferably not more than 56, and most preferably not more than 54.

In the practice of the invention, it is critical for the outer cover layer to have a Shore D hardness that is lower than the Shore D hardness of the inner cover layer. It is advantageous for the inner and outer cover layers to have a difference in Shore D hardness therebetween of preferably at least 2, more preferably at least 5, even more preferably at least 7, and most preferably at least 9, but preferably not more than 30, more preferably not more than 25, and even more preferably not more than 20.

It is recommended that the inner and outer cover layers have respective thicknesses of preferably at least 0.1 mm, more preferably at least 0.5 mm, and even more preferably at least 0.7 mm, but preferably not more than 5.0 mm, more preferably not more than 3.0 mm, even more preferably not more than 2.0 mm, and most preferably not more than 1.8 mm.

The golf ball of the invention may be manufactured for competitive use in accordance with the Rules of Golf; that is, to a diameter of at least 42.67 mm and a weight of not more than 45.93 g. It is recommended that the diameter be preferably not more than 44.0 mm, more preferably not more than 43.5 mm, and most preferably not more than 43.0 mm; and that the weight be preferably at least 44.5 g, more preferably at least 45.0 g, even more preferably at least 45.1 g, and most preferably at least 45.2 g.

In the golf ball of the invention, because a material obtained by molding a rubber composition under applied heat and having an excellent resilience is used in the core, the ball as a whole has an excellent rebound. Moreover, the golf ball of the invention has a good, soft feel on impact, an excellent spin performance, and is capable of achieving an increased distance.

EXAMPLES

The following Examples and Comparative Examples are provided by way of illustration and not by way of limitation.

Examples 1 to 3

Comparative Examples 1 to 6

Cores (spherical moldings) having a diameter of 36.4 mm and a weight of 29 g were produced by working together, with a kneader, the respective starting materials in the proportions shown in Table 1 below so as to prepare a rubber composition, then carrying out 20 minutes of vulcanization at 160° C. in a spherical mold.

TABLE 1

|  |  | Core No. | | | |
|---|---|---|---|---|---|
|  |  | No. 1 | No. 2 | No. 3 | No. 4 |
| Formulation (pbw) | Polybutadiene EC140 | 100 | | | |
|  | Polybutadiene BR51 | | 100 | | |
|  | Polybutadiene BR60 | | | 100 | |
|  | Polybutadiene BR11 | | | | 100 |
|  | Organic peroxide | 1.4 | 1.4 | 1.4 | 1.4 |
|  | Zinc oxide | 18 | 18 | 18 | 18 |
|  | Antioxidant | 0.1 | 0.1 | 0.1 | 0.1 |
|  | Zinc acrylate | 27 | 27 | 27 | 27 |
|  | Zinc salt of pentachlorothiophenol | 1 | 1 | 1 | 1 |

Details of the above formulation are provided below.

Polybutadiene rubber: EC140 (trade name), available from Firestone Polymers. Polymerized with a neodymium catalyst. Mooney viscosity, 43; $T_{80}$ value, 2.3.

Polybutadiene rubber: BR51 (trade name), available from JSR Corporation. Polymerized with a neodymium catalyst. Mooney viscosity, 39; $T_{80}$ value, 5.0.

Polybutadiene rubber: BR60 (trade name), available from Polimeri Srl. Polymerized with a neodymium catalyst. Mooney viscosity, 57; $T_{80}$ value, 4.6.

Polybutadiene rubber: BR11 (trade name), available from JSR Corporation. Polymerized with a nickel catalyst. Mooney viscosity, 44; $T_{80}$ value, 4.9.

Organic peroxide: Dicumyl peroxide, available from NOF Corporation under the trade name Percumyl D.

Zinc oxide: Available from Sakai Chemical Industry Co., Ltd. under the trade name Sanshu Sanka Aen. Average particle size, 0.6 μm (air permeametry).

Antioxidant: Available from Ouchi Shinko Chemical Industry Co., Ltd. under the trade name Nocrac NS-30.

Zinc acrylate: Available from Nippon Shokubai Co., Ltd. under the trade name ZN-DA85S.

The deflection of the core when compressed under a final load of 1,275 N (130 kgf) from an initial load state of 98 N (10 kgf) was determined. The results are given in Table 3.

Next, the resulting core was placed in a given mold, and the resin shown in Table 2 (A, B, C, X, Y or Z) was injection-molded, thereby forming an inner cover layer-encased core having a diameter of about 39.7 mm. The inner cover layer-encased core was then transferred to another mold and the resin shown in Table 2 (D, E or F) was injection-molded so as to produce a three-piece solid golf ball having a diameter of about 42.7 mm and a weight of about 45.3 g. Trade names of some of the ingredients used are indicated below.

Himilan: Ionomeric resins produced by DuPont-Mitsui Polychemicals Co., Ltd.

Surlyn: Ionomeric resins produced by E.I. DuPont & Nemours & Co.

Dynaron: A butadiene-styrene block copolymer hydrogenation product produced by JSR Corporation.

Pandex: Thermoplastic polyurethane elastomers produced by DIC-Bayer Polymer.

TABLE 2

|  | Formulation (pbw) | | | | | | | | |
|---|---|---|---|---|---|---|---|---|---|
|  | A | B | C | D | E | F | X | Y | Z |
| Himilan 1706 | 50 | | | | | | | | |
| Himilan 1605 | 50 | | | | | | | | |
| Himilan 1557 | | | | 20 | | | | | |
| Himilan 1855 | | | | 30 | | | | | |
| Surlyn 8945 | | 35 | | | | | | | |
| Surlyn 9945 | | 35 | | | | | | | |
| Surlyn 8120 | | | 100 | | 50 | | | | |
| Dynaron 6100P | | 30 | | | | | | | |
| Pandex T8290 | | | | 50 | | | | | |
| Pandex T8295 | | | | 50 | 100 | | | | |
| Titanium dioxide | 4 | 4 | 4 | 2.7 | 2.7 | 4 | 4 | 4 | 4 |
| Nucrel AN4319 | | | | | | | 75 | | 40 |
| Nucrel N035C | | | | | | | | 40 | |
| Surlyn 6320 | | | | | | | | 60 | |
| Nucrel N1560 | | | | | | | 25 | | |
| Escor 5100 | | | | | | | | | 60 |
| Oleic acid | | | | | | | 25 | | |
| Magnesium stearate | | | | | | | | 69 | 100 |
| Magnesium oxide | | | | | | | 3.6 | 0.8 | 2.8 |

The performances of the golf balls obtained were examined as follows. The results are shown in Table 3.

Material Properties

The Shore D hardnesses of the inner cover layer and the outer cover layer are shown as the surface hardnesses of the respective materials, as measured with a durometer by the test method described in ASTM D2240.

Golf Ball Properties

The carry and total distance were measured when the ball was hit at a head speed of 50 m/s with a driver (W#1) mounted on a swing machine.

Feel

The feel of the ball when actually shot with a driver (number one wood) and a putter was rated by five professional golfers and five top-caliber amateur golfers as "too hard," "good" or "too soft." The rating assigned most often to a particular ball was used as that ball's overall rating.

Spin on Approach Shots

The spin rate of the golf ball when hit at a head speed of 20 m/s using a sand wedge (SW) mounted on a swing robot was measured.

TABLE 3

|  |  | Example | | | Comparative Example | | | | | |
|---|---|---|---|---|---|---|---|---|---|---|
|  |  | 1 | 2 | 3 | 1 | 2 | 3 | 4 | 5 | 6 |
| Core | Type | 1 | 1 | 1 | 1 | 1 | 1 | 2 | 3 | 4 |
|  | Diameter (mm) | 36.4 | 36.4 | 36.4 | 36.4 | 36.4 | 36.4 | 36.4 | 36.4 | 36.4 |

TABLE 3-continued

| | | Example | | | Comparative Example | | | | | |
|---|---|---|---|---|---|---|---|---|---|---|
| | | 1 | 2 | 3 | 1 | 2 | 3 | 4 | 5 | 6 |
| | Weight (g) | 29 | 29 | 29 | 29 | 29 | 29 | 29 | 29 | 29 |
| | Deflection (mm) | 3.7 | 3.7 | 3.7 | 3.7 | 3.7 | 3.7 | 3.7 | 3.7 | 3.6 |
| Inner cover layer | Type | X | Y | Z | A | B | C | B | B | B |
| | Shore D hardness | 53 | 56 | 54 | 63 | 56 | 45 | 56 | 56 | 56 |
| | Specific gravity | 0.97 | 0.97 | 0.97 | 0.98 | 0.97 | 0.98 | 0.97 | 0.97 | 0.97 |
| | Gauge (mm) | 1.65 | 1.65 | 1.65 | 1.65 | 1.65 | 1.65 | 1.65 | 1.65 | 1.65 |
| Outer cover layer | Type | E | E | E | D | E | F | E | E | E |
| | Shore D hardness | 51 | 51 | 51 | 47 | 51 | 53 | 51 | 51 | 51 |
| | Specific gravity | 1.18 | 1.18 | 1.18 | 1.18 | 1.18 | 0.98 | 1.18 | 1.18 | 1.18 |
| | Gauge (mm) | 1.50 | 1.50 | 1.50 | 1.49 | 1.50 | 1.50 | 1.50 | 1.50 | 1.50 |
| Ball properties (#W1, HS 50) | Carry (m) | 240.8 | 241.2 | 241.8 | 238.4 | 238 | 228.6 | 226.1 | 225.3 | 223.3 |
| | Total distance (m) | 271.5 | 272.0 | 272.6 | 268.8 | 268.6 | 258.2 | 252.5 | 251.8 | 249.8 |
| | Spin rate (rpm) | 3070 | 3100 | 3080 | 3301 | 3338 | 3404 | 3325 | 3340 | 3329 |
| | Feel | good | good | good | good | good | too soft | good | good | good |
| Spin rate on approach shot (rpm) (Sand wedge, HS 20) | | 6430 | 6520 | 6480 | 6703 | 6600 | 6557 | 6270 | 6229 | 6198 |
| Feel on shots with putter | | good | good | good | good | good | too soft | good | good | good |

As is apparent from the results shown in Table 3, compared with the golf balls in the examples of the invention, the golf balls in Comparative Examples 1 to 6 failed to travel a satisfactory distance and had a poor feel on impact.

The invention claimed is:

1. A multi-piece solid golf ball comprising a core, an inner cover layer and an outer cover layer, wherein the core is made of a material obtained by molding under applied heat a rubber composition comprising (a) a base rubber containing polybutadiene having a stress relaxation time ($T_{80}$), defined as the time in seconds from the moment when rotor rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; the inner cover layer has a Shore D hardness of from 50 to 80; the outer cover layer has a Shore D hardness of from 35 to 60 which is lower than the Shore D hardness of the inner cover layer; and the inner cover layer is formed primarily of a resin composition obtained by mixing:

100 parts by weight of a base resin of (A-I) from 100 to 30 wt % of an olefin-unsaturated carboxylic acid-unsaturated carboxylic acid ester ternary random copolymer and/or a metal salt thereof and (A-II) from 0 to 70 wt % of an olefin-unsaturated carboxylic acid binary random copolymer and/or a metal salt thereof, (B) from 5 to 170 parts by weight of a fatty acid or fatty acid derivative having a molecular weight of from 280 to 1500, and (C) from 0.1 to 10 parts by weight of a basic inorganic metal compound capable of neutralizing acid groups within components A and B.

2. The golf ball of claim 1, wherein the rubber composition further comprises (d) an organosulfur compound.

3. The golf ball of claim 1, wherein the polybutadiene having a stress relaxation time ($T_{80}$) of 3.5 or less accounts for at least 40 wt % of the base rubber.

4. The golf ball of claim 1, wherein the polybutadiene having a stress relaxation time ($T_{80}$) of 3.5 or less is a polybutadiene prepared using a rare-earth catalyst.

5. The golf ball of claim 1, wherein the polybutadiene having a stress relaxation time ($T_{80}$) of 3.5 or less is a polybutadiene prepared by polymerization using a rare-earth catalyst, followed by terminal modification.

6. The golf ball of claim 1, wherein the olefin-unsaturated carboxylic acid-unsaturated carboxylic acid ester ternary random copolymer and/or metal salt thereof making up component (A-I) has a weight-average molecular weight (Mw) of at least 100,000 but not more than 200,000 and has a weight-average molecular weight (Mw) to number-average molecular weight (Mn) ratio of at least 3 but not more than 7.0.

7. The golf ball of claim 1, wherein the olefin-unsaturated carboxylic acid binary random copolymer and/or metal salt thereof making up component (A-II) has a weight-average molecular weight (Mw) of at least 150,000 but not more than 200,000 and has a weight-average molecular weight (Mw) to number-average molecular weight (Mn) ratio of at least 3 but not more than 7.0.

8. The golf ball of claim 1, wherein the resin composition has a melt flow rate, as measured in accordance with JIS-K6760 at a test temperature of 190° C. and a test load of 21 N (2.16 kgf), of at least 1 g/10 min but not more than 30 g/10 min.

* * * * *